UNITED STATES PATENT OFFICE.

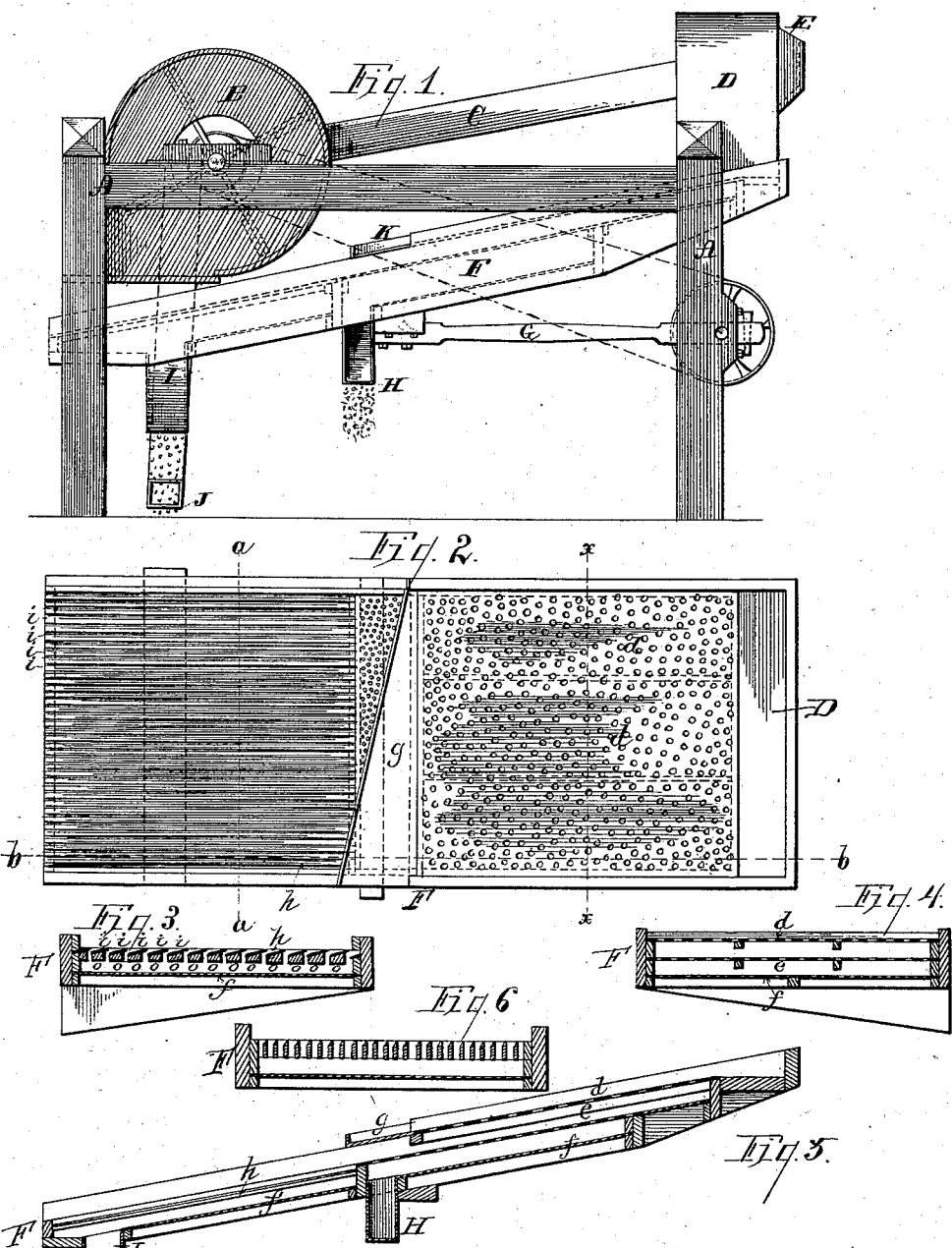

LYMAN MORGAN, OF PORT WASHINGTON, WISCONSIN.

MACHINE FOR CLEANING FLAXSEED.

SPECIFICATION forming part of Letters Patent No. 282,211, dated July 31, 1883.

Application filed December 5, 1881. (No model.)

*To all whom it may concern:*

Be it known that I, LYMAN MORGAN, of Port Washington, in the county of Ozaukee and State of Wisconsin, have invented certain new and useful Improvements in Machines for Cleaning Flaxseed; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates particularly to machines for cleaning flaxseed, although it can be used to clean similarly-shaped seed of other kinds, in the separation of which similar difficulties arise.

My improved device consists of a screen having horizontal parallel strips so inclined at their upper edges as to cause the flat flaxseeds to overbalance and slide between the strips edgewise and to retain more spherically-shaped seeds, in combination with means for shaking the screen and causing the passage of the grain over the same, substantially as hereinafter described and claimed.

In the accompanying drawings, similar letters are used to designate like parts, and in the same Figure 1 is a side elevation of my improved flaxseed-separator. Fig. 2 is a plan view of the shaker-frame and sieves or riddles in the same. Fig. 3 is a vertical section of the shaker on the line $a\, a$, Fig. 2. Fig. 4 represents a vertical section on the line $x\, x$, Fig. 2. Fig. 5 is a vertical section on the line $b\, b$ of Fig. 2. Fig. 6 represents an equivalent device to that shown in Fig. 3.

A is the frame of the separator, constructed of any desirable form. B is a suction-fan. C is a wind-pipe, through which the fan B draws the chaff, dust, and light impurities that are mingled with the flaxseed as it enters the head of the separator D through the entrance-spout E. A shaker-frame, F, is suspended in the frame A by vibrative straps in any suitable way, and a shaking motion is communicated to it by means of a pitman, G, from a crank-shaft driven by the same power which serves to drive the fan B. Flaxseed as it is usually grown is, when thrashed, more or less mixed with the seeds of cockle and other weeds, which are very difficult of separation and greatly injure the quality and value of the flaxseed, and an apparatus for cleaning the same has long been sought. The difficulty arises from the peculiar shape and size of the flaxseed, which in breadth nearly approaches in size the diameter of the seeds mixed therewith. Any riddle, as the same have heretofore been constructed, which will permit the passage of the cockle-seeds will also permit the passage of the flaxseed; hence I have been obliged to construct my separator to obviate these difficulties in a peculiar manner. $d$ is a coarse riddle, with perforations made large enough to afford free passage for the flaxseed and all except the various impurities larger than itself. The latter are carried over the side of the upper riddle by the spout $g$ at the lower end of riddle $d$. After passing through the riddle $d$ the seeds strike upon a finer-meshed riddle, $e$, with perforations of a size to permit the smaller seeds and impurities to pass, but which will retain all the flaxseed. The seeds and impurities which pass through the screen $e$ strike upon the close floor or bottom $f$ and pass downward toward the foot of the screen-frame and into the spout H. The screen $e$ occupies only the upper half of the shaker-frame F, and on leaving it the seeds pass upon a screen, $h$, lying in the same plane with screen $e$. The screen $h$ is constructed of thin strips of tin or other sheet metal, $i\, i\, i$, running lengthwise of the shaker, and preferably arranged in the position shown in Fig. 3, being fastened to underlying parallel strips separated by spaces, and marked $o\, o\, o$. The strips $i\, i\, i$ overlap one another slightly, like shingles, and their overlying edges are separated by a space only slightly greater than the thickness of a flaxseed. The strips $i\, i\, i$ are also transversely inclined, preferably at an angle of about five to ten degrees, and are of any desirable width, but preferably of from one-half to five-eighths of an inch. Beneath the screen $h$ the floor or bottom $f$ also extends, leading into a catch-spout, J.

Instead of constructing the screen $h$ in the manner described, I may construct it with the strips $i\, i\, i$ upright, as shown in Fig. 6, and with or without beveled upper edges; but I prefer the construction previously described.

My improved device operates as follows:

The flaxseed, passing into the machine at E, is winnowed by the action of the suction-fan B, and the seeds fall upon the upper screen, $d$, which removes the coarser impurities, which pass over at spout $g$, as previously described. The flaxseed and all seeds of equal and smaller size pass through it and fall upon the screen $e$. The screen $e$ allows the seeds smaller than the flaxseed's width to pass through it, while the flaxseed and the remaining weed-seeds pass over it and upon the screen $h$. The seeds of flax are flattened like those of the melon or squash, and hence when passing over the shaking screen lie upon their flat side. Their edges are thus presented to the openings between the strips $i\ i\ i$, and they pass between them, their motion being accelerated by the transverse inclination of the strips. As the cockle and remaining weed seeds are of a size as great in diameter as the width of the flaxseeds, they cannot pass between the strips, and hence are retained and pass over the foot of the screen into any receptacle properly placed to receive them.

The essential idea of my invention is to provide openings in the screen $h$ arranged in such a manner as to cause the flaxseed to pass through edgewise, while the rounder seeds are carried over. No other means of separation can be used successfully, because any screen which will allow cockle and similar seeds to pass through will permit the passage of flaxseed, endwise, and the shaking of the screens would cause many of the seeds of flax to pass through endwise. Advantage must consequently be taken of the lesser thickness of the flaxseed, since the cockle and weed seeds are nearly spherical, and the means which I have described are the best devices for the purpose which I have been able to discover.

I by no means claim as my invention the shaker F nor the suction-fan B, either alone or in combination, broadly; but

I claim—

In a flaxseed-cleaning machine, a screen having longitudinal parallel strips inclined at their upper edges to cause the flat flaxseeds to overbalance and slide between the strips edgewise, and to retain the more spherical seeds, in combination with means for shaking the screen and causing the passage of the grain over it.

In testimony that I claim the foregoing as my own I affix my signature in presence of two witnesses.

LYMAN MORGAN.

Witnesses:
CHAS. L. GOSS,
E. H. BOTTUM.